United States Patent
Fujikawa

(10) Patent No.: US 7,461,984 B2
(45) Date of Patent: Dec. 9, 2008

(54) SINGLE-LENS REFLEX CAMERA

(75) Inventor: Naoki Fujikawa, Hachioji (JP)

(73) Assignee: Olympus Imaging Corp., Shibuya-Ku, Tokyo (JP)

(*) Notice: Subject to any disclaimer, the term of this patent is extended or adjusted under 35 U.S.C. 154(b) by 313 days.

(21) Appl. No.: 11/518,097

(22) Filed: Sep. 8, 2006

(65) Prior Publication Data

US 2007/0053683 A1 Mar. 8, 2007

(30) Foreign Application Priority Data

Sep. 8, 2005 (JP) .................... 2005-261052

(51) Int. Cl.
*G03B 9/08* (2006.01)

(52) U.S. Cl. ............ 396/489; 396/387; 396/401; 396/402; 396/443; 396/444; 396/452; 396/411; 396/354; 396/355

(58) Field of Classification Search .......... 396/489
See application file for complete search history.

(56) References Cited

U.S. PATENT DOCUMENTS

| 4,441,800 | A | * | 4/1984 | Nakano ............ 396/461 |
| 4,958,175 | A | * | 9/1990 | Asakura et al. ...... 396/406 |
| 5,410,378 | A | * | 4/1995 | Tasaka et al. ........ 396/6 |
| 6,174,093 | B1 | * | 1/2001 | Kitazawa et al. ..... 396/358 |
| 6,389,234 | B1 | * | 5/2002 | Ikuyama et al. ...... 396/195 |

FOREIGN PATENT DOCUMENTS

JP          07-036105        2/1995

* cited by examiner

*Primary Examiner*—W. B. Perkey
*Assistant Examiner*—Fang-Chi Chang
(74) *Attorney, Agent, or Firm*—Volpe and Koenig, P.C.

(57) ABSTRACT

In a single-lens reflex camera, the rotation center of a lever used for driving a shutter device is arranged rearward of a shutter device with respect to an optical axis, and the lever end (point of action) is arranged in front of the shutter device with respect to the optical axis. Thereby, compactness of the camera body can be realized.

6 Claims, 3 Drawing Sheets

FRONT SIDE
(PHOTOGRAPHING LENS SIDE)

REAR SIDE
(IMAGE PICKUP ELEMENT SIDE)

SINGLE-LENS REFLEX CAMERA

CROSS-REFERENCE TO RELATED APPLICATION

This application is based upon and claims the benefit of priority from prior Japanese Patent Application No. 2005-261052, filed on Sep. 8, 2005, the entire contents of which are incorporated herein by reference.

BACKGROUND OF THE INVENTION

1. Field of the Invention

The present invention relates to an arrangement of parts of a single-lens reflex camera, especially parts in a camera body.

2. Description of the Related Art

A general arrangement of parts in a camera body of a conventional single-lens reflex camera having a vertical shutter device internally is shown in FIG. 4. FIG. 4 is a schematic view of the arrangement inside the camera body of the conventional single-lens reflex camera, seen from the top.

In a conventional single-lens reflex camera 100, a mirror box 53 is arranged in the center of a camera body 51 in the state in which the mirror box 53 is fixed to a front plate 52. A vertical shutter device 55 is fixed to the rear surface of the mirror box 53 in the direction of an optical axis O. An image pickup device 62 is arranged on the rear side of the shutter device 55 in the direction of an optical axis O in the state in which the image pickup device 62 is mounted on an image pickup substrate 63.

The shutter device 55 has a base plate (bottom plate) 55a, and a shutter control portion 56 for driving the shutter to open and close is arranged on the right end part of the base plate 55a. A cam portion 61 and a swing lever 58 for driving the shutter control portion 56 are arranged in the lower part of the shutter control portion 56 and on the front side (photographing lens side) of the shutter control portion 56 with respect to the optical axis.

More specifically, the swing lever 58 is swingablly supported by a support shaft 59 arranged on the front side of the base plate 55a in the direction of the optical axis O. The swing lever 58 is driven in a swinging manner by the rotation of the cam portion 61, and drives and presses the end of a charged lever 57 provided in the shutter control portion 56 for charging the shutter.

Meanwhile, a body mount 54 for mounting an interchangeable lens is fixed to the front of the mirror box 53. Further, a grip portion 51a for holding the camera is provided on the right of the camera body 51.

A camera disclosed in Japanese Unexamined Patent Publication No. 7-36104 is an example which has the similar arrangement of the swing lever of the vertical shutter device of the conventional single-lens reflex camera of FIG. 4.

In the case of the conventional single-lens reflex camera 100 shown in FIG. 4, since the fulcrum of swing movement of the swing lever 58 (the position of the supporting shaft 59) is arranged in front of the shutter control portion 56, that is, in front of the base plate 55a, it is necessary to have a space for arranging the swing lever 58 in front of the shutter control portion 56. Therefore, the distance $B_0$ between the concave portion 51b of the grip portion 51a of the camera body 51 and the rear surface of the shutter device 55 in the direction of the optical axis (the image pickup element side) becomes longer. As a result, the thickness $A_0$ of the grip 51a in the direction of front and back of the grip portion 51a becomes thicker. Furthermore, the distance $E_0$ from the rear surface of the shutter device 55 to the lens mount 54 becomes longer.

BRIEF SUMMARY OF THE INVENTION

The single-lens reflex camera according to the present invention is aimed to improve the arrangement of a lever used for driving a shutter device. In the single-lens reflex camera according to the present invention, the rotation center of the lever is arranged to rearward of the shutter device with respect to an optical axis (on the rear side of the single-lens reflex camera, as viewed in the direction of the optical axis), and the end of the lever (point of action) is arranged in the front with respect to the optical axis (on the front side of the single-lens reflex camera, as viewed in the direction of the optical axis). Thereby, compactness of the camera body can be realized.

An example of the structure of the single-lens reflex camera of the present invention is following: it comprises a shutter device having a shutter control portion on one side thereof, and a shutter blade movable in a direction orthogonal to an optical axis; a cam plate having a cam portion for charging a charged lever included in the shutter control portion of the shutter device; and a swing lever having a rotation center arranged to rearward of the shutter device with respect to the optical axis and a lever end arranged toward the front with respect to the optical axis, the swing lever being swung by the cam plate to charge the charged lever.

According to the present invention, compactness of the camera body in the single-lens reflex camera can be realized.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENTS

A preferred embodiment of the invention is described below with reference to the accompanying drawings.

Figure 1:
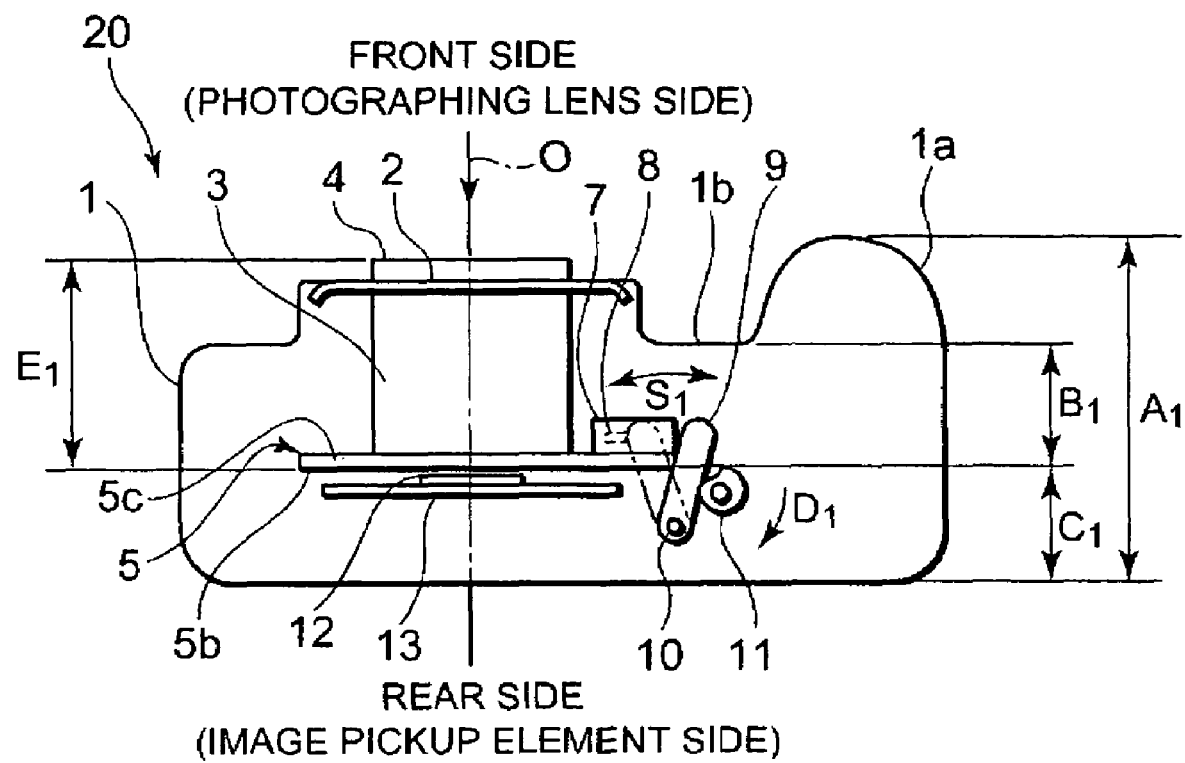
FIG. 1 is a schematic view, seen from the top, of an arrangement inside a camera body of a single-lens reflex camera according to the present invention.
Figure 2:
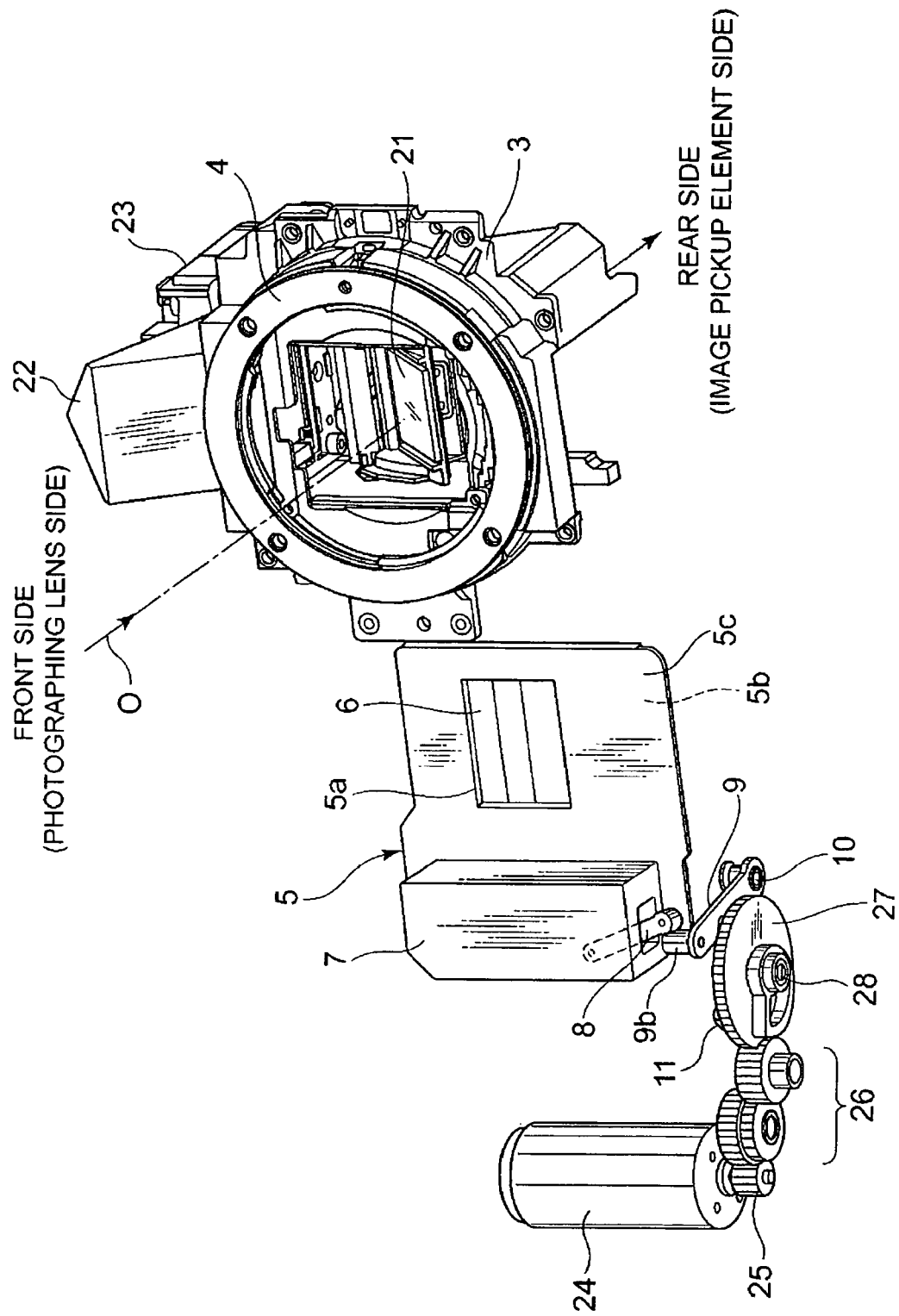
FIG. 2 is an exploded perspective view, seen from the lower front side, of a mirror box, a shutter device, a swing lever, and a charge driving system of the swing lever included in the camera body of FIG. 1.
Figure 3:
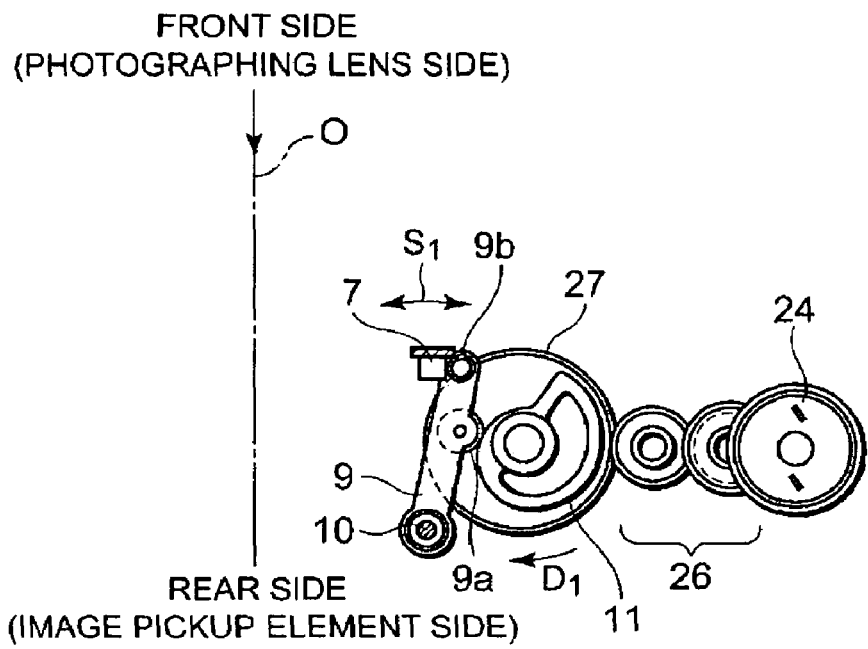
FIG. 3 is a view, seen from the upper side, of the swing lever and the charge driving system of FIG. 2.

FIG. 1 is a schematic view, seen from the top, of an arrangement inside the camera body of the single-lens reflex camera according to the present invention. FIG. 2 is an exploded perspective view, seen from the lower front side, of a mirror box, a shutter device, a swing lever, and a charge driving system of the swing lever included in the camera body. FIG. 3 is a view, seen from the upper side, of the swing lever and the charge driving system thereof.

Here, the side of the photographing lens of the camera body is called as the front side in the direction of an optical axis O, the side of the image pickup device is called as the rear side in the direction of the optical axis, and the left and right directions (the horizontal direction) are indicated by the left and right directions viewed from above in FIG. 1 (the left and right directions viewed from the rear side).

The single-lens reflex camera 20 according to the present invention is a type of a digital camera, and a mirror box 3 is arranged in the center of the camera body in such a manner that the mirror box 3 is fixed to a front plate 2, as shown in FIG. 1. A vertical shutter device 5 is fixed to the rear surface of the mirror box 3, and an image pickup element 12 is arranged on the rear side 5b of the shutter device 5 in such a manner that the image pickup device 12 is mounted on an image pickup element substrate 13. Further, a swing lever 9 and a charge driving system are arranged in the lower right part of the shutter device 5.

As shown in FIGS. 1 and 2, a movable mirror 21 is arranged in the mirror box 3, and a prism 22 and an eye piece 23 are arranged on the top of the mirror box 3.

Furthermore, the shutter device includes a base plate 5c, a shutter opening 5a which is opened and closed by a shutter blade 6 is arranged in the center of the base plate 5c, and a shutter control portion 7 for driving the shutter to close and open is arranged on the right side of the opening 5a. The rear surface 5b of the wall provided with the opening 5a is orthogonal to the optical axis O, and the shutter blade 6 moves parallel to the rear surface 5b to open and close.

The shutter control portion 7 includes a swingable charged lever 8 driven at the time of charging the shutter, and the charged lever 8 is driven to swing along the surface orthogonal to the optical axis O. The end of the charged lever 8 projects downward, and is driven and swung by a swing lever 9 described later, to the left side in FIG. 1 during charge driving.

In the lower portion of the shutter control portion 7, the swing lever 9 serving as a charge lever and swingablly supported by a supporting shaft 10, and the charge driving system are arranged.

The charge driving system includes a charge motor 24, a gear train 26 driven by a pinion 25 of the charge motor 24, and a cam plate 27 having a gear portion driven by the gear train 26. A charge driving cam portion 11 and a mirror driving cam portion 28 are integrally provided with the cam plate 27; the charge driving cam portion 11 is on the upper side and the mirror driving cam portion 28 is on the lower side.

As shown in FIG. 3, the swing lever 9 is swingablly supported by the support shaft 10, and has a driven roller 9a driven and pressed by the cam portion 11, and a roller 9b for engaging with the charged lever 8 on the end thereof. The support shaft 10 is arranged at a position below the shutter control portion 7 and to rearward of the shutter control portion 7 of the shutter device 5, and also on the rear side of the base plate 5c in the direction of the optical axis O. The swing lever 9 is supported in such a manner that the roller 9b on the end of the swing lever 9 is positioned on the front side of the supporting shaft 10.

The swing lever 9 is swung (to S1 direction) in the horizontal direction (the right and left direction) centering around the supporting shaft 10 by the rotation in one direction (D1 direction) of the cam portion 11 of the cam plate 27 during charge operation, thereby the end of the charged lever 8 is driven and pushed by the roller 9b in the left direction against the charge force.

Meanwhile, a body mount 4 for mounting an interchangeable lens is fixed to the front of the front plate 2. Further, a grip portion 1a for holding the camera and a grip concave portion 1b are provided on the right of the camera body 1.

In the single-lens reflex camera 20 with the above mentioned structure, the shutter device 5 is charged before exposure of the image pickup element 12. The charge operation is done by driving the charge motor 24. The cam plate 27 is driven to rotate in the D1 direction by the charge motor 24, and the swing lever 9 swings in the S1 direction in accordance with the rotation of the cam plate 27, then the charge lever 8 is driven to swing. The shutter device 5 is charged by the swinging movement of the charged lever 8.

Figure 4:
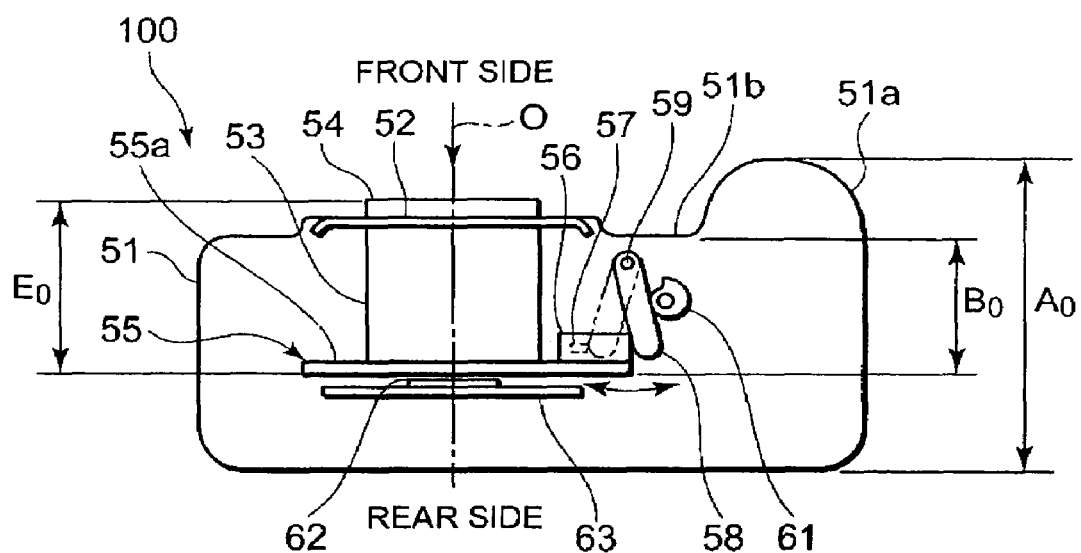
FIG. 4 is a schematic view of an arrangement, seen from the top, inside a camera body of a conventional single-lens reflex camera.

In the camera body 1 of the single-lens reflex camera 20, as described above, the swing lever 9 is supported by the support shaft 10 positioned on the right rear side of the shutter device 5, and the roller 9b at the end of the swing lever 9 is positioned on the front side and arranged so that the roller 9b does not substantially project forward further than the shutter control portion 7. Therefore, unlike the conventional camera body 51 of FIG. 4, the distance $B_1$ (the distance between the concave portion 1b and the rear surface 5b of the shutter device 5), which is the distance of the front and rear directions of the concave portion 1b of the grip portion 1a of the camera body 1, can be shortened regardless of the position of the support shaft of the swing lever 58. Thereby, the position of the concave portion 1b can be shifted further backward.

Meanwhile, the image pickup device 12 (not shown), an LCD display portion (not shown), and the like, are arranged on the portion of the camera body 1 further rearward of the shutter device 5, however, the support shaft 10 can be arranged in the portion of the distance $C_1$, like the conventional single-lens reflex camera.

By shifting the concave portion 1b to further rearward as described above, it is possible to cause the thickness $A_1$ in the front and rear direction of the grip portion 1a to be thinner, and possible to make the camera body 1 compact. Furthermore, even if the mirror box 3 and the body mount 4 having the distance $E_1$ in the direction of the optical axis O, which is shorter, are to be arranged, there is no problem and the camera can be still miniaturized.

The single-lens reflex camera of the present invention has been explained as a digital camera, however, the same arrangement can be applied to a film camera by arranging the swing lever 9 in a position not hindering its film path, and thus compactness of the film camera can be realized.

The single-lens reflex camera according to the present invention can be used for making a camera body compact.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. A single-lens reflex camera comprising:
   a shutter device having a shutter control portion arranged on one side thereof and a shutter blade movable in a direction orthogonal to an optical axis;
   a cam plate having cam portion for charging a charged lever included in the shutter control portion of the shutter device; and
   a swing lever having a rotation center arranged rearward of the shutter device with respect to the optical axis and a lever end arranged toward the front with respect to the optical axis, the swing lever being swung by the cam plate to charge the charged lever.

2. The single-lens reflex camera according to claim 1, wherein
the camera body has an image pickup device rearward of the shutter device, and the rotation center of the swing lever is arranged rearward of the image pickup device in the direction of the optical axis.

3. The single-lens reflex camera according to claim 1, wherein
the charged lever swings in a direction along a plane orthogonal to the optical axis, and the swing lever swings about an axis of rotation orthogonal to the optical axis.

4. The single-lens reflex camera according to claim 3, wherein
the camera body has an image pickup device rearward of the shutter device, and the rotation center of the swing lever is arranged rearward of the image pickup device in the direction of the optical axis.

5. The single-lens reflex camera according to claim 1, wherein
the cam plate rotates, and a central axis of rotation of the cam plate is arranged rearward of the shutter device in the direction of the optical axis.

6. A single-lens reflex camera comprising:
a shutter device;
a swing lever for charging the shutter device, a rotation center of swing movement of the swing lever being arranged rearward of the shutter device, a point of action of the swing lever being arranged further in front of the shutter device; and
a cam contacting the swing lever for driving the swing lever, a rotation center of the cam being arranged in front of the rotation center of swing movement and rearward of the shutter device.

* * * * *